United States Patent [19]

Kiefl

[11] Patent Number: 5,382,970
[45] Date of Patent: Jan. 17, 1995

[54] TELEVISION VIEWER MONITORING SYSTEM INCLUDING PORTABLE DATA METER FOR EACH VIEWER

[76] Inventor: John B. Kiefl, 17 Castlethorpe Crescent, Nepean, Ontario, Canada, K2G 5P6

[21] Appl. No.: 732,929

[22] Filed: Jul. 19, 1991

[51] Int. Cl.6 ............................................. H04H 9/00
[52] U.S. Cl. ..................................... 348/1; 455/2; 455/33.1
[58] Field of Search .................... 358/84; 455/4.1, 4.2, 455/5.1, 33.1; 379/59, 63, 92; 348/1, 2

[56] References Cited

U.S. PATENT DOCUMENTS

| | | | |
|---|---|---|---|
| 4,107,734 | 8/1978 | Percy et al. | 358/84 |
| 4,566,030 | 1/1986 | Nickerson et al. | 358/84 |
| 4,718,106 | 1/1988 | Weinblatt | 455/2 |
| 4,905,080 | 2/1990 | Watanabe | 358/84 |
| 4,912,756 | 3/1990 | Hop | 379/63 |
| 4,930,011 | 5/1990 | Kiewit | 358/84 |
| 4,945,412 | 7/1990 | Kramer | 358/142 |
| 4,955,070 | 9/1990 | Welsh | 358/84 X |
| 5,128,933 | 7/1992 | Baranoff-Rossine | 370/69.1 |

FOREIGN PATENT DOCUMENTS

| | | | |
|---|---|---|---|
| 1105128 | 7/1980 | Canada | 350/30.5 |
| 0195639 | 9/1986 | European Pat. Off. | H04H 9/00 |
| 0309326 | 3/1989 | European Pat. Off. | H04H 9/00 |
| 1159524 | 12/1963 | Germany | . |
| 3742425 | 6/1989 | Germany | H04N 17/04 |
| 2196167 | 4/1988 | United Kingdom | G11B 20/08 |

*Primary Examiner*—Curtis Kuntz
*Assistant Examiner*—Edward Urban
*Attorney, Agent, or Firm*—Thomas Adams & Assoc.

[57] ABSTRACT

In a system for monitoring and collecting data on the viewing habits of television viewers or radio listeners, to enable operators of networks or television stations, programmers and advertisers to determine the numbers of viewers watching particular programs, a portable personal data collection device comprises a detector for providing a station identifier identifying the particular broadcast signal being received by the receiver, a clock for providing a signal representing time, a memory for storing data, a cellular telephone module for communicating with a central location, a control for the cellular telephone module, and a microprocessor. The microprocessor stores in the memory data comprising the station identification, and the time at the beginning and end of receiving signals from that station. The control is arranged to control operation of the cellular telephone module to transmit the stored data to the central location. The control may respond firstly to a time signal representing a preselected time for operating the cellular telephone module to call the central location and secondly to communication being established with the central location before transmitting the data. Additionally, or alternatively, the control may respond to a call initiated from the central location to transmit the data. The data collection device may include a detector for detecting a channel selection signal from a television remote control to change the station identifier stored in memory. Manual inputs, for example pushbuttons, may be provided for confirming that the user is actually in attendance.

22 Claims, 6 Drawing Sheets

TELEVISION VIEWER MONITORING SYSTEM INCLUDING PORTABLE DATA METER FOR EACH VIEWER

BACKGROUND OF THE INVENTION

This invention relates to a system for monitoring and collecting data on audience participation and a device for use in such a system. The invention is especially, but not exclusively, applicable to a system for collecting data on a the viewing habits of television viewers and transmitting the data to a central location.

It is important to networks, television stations, programmers and advertisers to determine the numbers of viewers watching particular programs. Such information could be used to determine market share and the ratings of particular programs. Since the beginning of television attempts have been made to gather information on the viewing habits of television viewers. The earlier systems were quite simple and included the keeping of a diary by a number of randomly selected viewers. These viewers were asked to enter into their diary a record of the channels viewed and the start time and end time for the viewing of each channel. Since diaries are limited to the amount of space that can be provided, viewing records are not very precise and short intervals of tuning may not even be recorded by the survey respondents. The diaries would be collected usually by mail and would take up to several weeks to process and provide the data to the people conducting the survey. This system was cumbersome and required considerable effort by the viewer selected. In addition there was a considerable time lag between the showing of a program and the determination of the results. For the system to give accurate results, it was essential that the viewer keeping the diary be able to read and comprehend fairly complex instructions as well as to know which station is being watched among the ever increasing number of stations available. The average cable TV subscriber can have 40 or more channels available, and it is increasingly difficult to recognize channels and record them accurately in a diary. While the diary system is still in use today it is the subject of much methodological criticism, especially with the increasing amount of "junk" mail and people being more hesitant to participate in surveys.

Subsequent systems became more efficient and more complex. For example, U.S. Pat. No. 4,566,030-Nickerson et al., issued Jan. 21, 1986, describes a television viewer data collection system having a remote unit at each viewer location with a viewer control for each television receiver. The viewer control includes a channel selector and the viewer control is wired to either a cable converter or the television receiver and the remote unit. The remote unit includes a clock, a microprocessor and a memory. As the viewer operates the viewer control to turn on the associated television receiver and to select a channel, the time and the selected channel are stored in the memory of the remote unit. The remote unit is connected via a modem to a telephone line. At a preselected time the remote unit initiates a call to a central location and, when a connection is established, the remote unit transmits the data stored in its memory to a central location. It will be seen that this type of television data collection system is a great improvement over much earlier systems. It does not require the viewer to perform the onerous task of making repeated diary entries. It does, however, require equipment to be connected to both the television receiver (or cable converter) and a telephone line.

There are many shortcomings in this approach, as a result. The equipment and the installation of the equipment tends to be quite expensive. The system is geared only to measure viewing done in the primary residence of the persons chosen to be in the study. Because of the complexity of recruiting and installing the equipment in each household in the survey, the households are asked to participate in the research for months and on occasion for sometimes more than a year. This means there is a possibility that, among other things, the viewing data can be subjected to certain biases.

Other monitoring systems are known, for example only, the systems described in Canadian Patent No. 1,105,128-Thompson, issued Jul. 14, 1981 and in U.S. Pat. No. 4,107,734-Percy et al, issued Aug. 15, 1978. These systems require connection to either the television receiver being monitored, the antenna or cable converter, or a telephone line.

U.S. Pat. No. 4,718,106 (Weinblatt) issued Jan. 5, 1988 discloses a portable signal detector which responds to audible signals to record automatically the fact that the carrier of the unit is listening to the station transmitting the audible signals. The system is passive, i.e. requires no direct input from the carrier. A drawback, however, is that the device could be activated without the listener being present or paying attention to the receiver. Moreover, Weinblatt proposes to use an audible signal which could be a distraction.

An object of the present invention is to overcome many of the foregoing problems.

SUMMARY OF THE INVENTION

According to one aspect of the invention, a portable personal data collection device, for use in monitoring audience attention to receivers for receiving broadcast signals from a number of broadcast stations, comprises detector means for providing a station identifier identifying the particular one of said broadcast signals being received by said receiver, a clock for providing a signal representing time, a memory for storing data, a cellular telephone module for communicating with a central location, a control for said cellular telephone module, and a processor means, said processor means being responsive to said signal representing the time and to said station identifier for storing in said memory data comprising the time at the beginning and end of receiving signals from said particular one of said broadcast stations, and the station identification, said control serving to control operation of said cellular telephone module to transmit to said central location the said data stored in said memory.

The control may be responsive firstly to the time signal representing time corresponding to a preselected time for operating the cellular telephone module to call the central location and secondly to communication being established with the central location. Additionally, or alternatively, the control may be responsive to a call initiated from the central location to transmit the data.

According to another aspect of the invention, there is provided a data collection device for collecting data on the viewing activity of a person viewing a television receiver capable of being tuned to receive one of a plurality of channels, each channel representing a television signal from a respective one of a plurality of television broadcast stations, the television receiver being operable by means of a remote control for generating at least a channel selection signal. The device comprises detector means responsive to said channel selection signal for providing a station identifier, clock means for providing a time signal representing current time, manual input means for entering a confirmation signal indicating that the viewer is in attendance, processor means responsive initially to said station identifier, said confirmation signal and said clock means for recording said channel and said time signal as representing the time at which said channel was selected and the time at which said selection of said channel was discontinued, and responsive subsequently to said station identifier and said time signal to record changes in the channel to which the receiver is tuned and the times at which such changes occurred.

Preferred embodiments of the present invention provide a television viewer monitoring system that need not be wired or connected in any way to a television receiver or to a telephone line. The physical equipment itself consists of a small data collection device that is wireless and portable. It can be carried about the household or elsewhere to record viewing that takes place on any television that the viewer chooses to watch. Typically, all persons in a household chosen to participate in a research or survey would be provided with a separate data collection device. The present invention needs only a minimum of attention by the viewer and consequently encourages viewer participation. In addition, it is able to provide individual records. That is, the system of the invention is able to record individually the viewing habits of two or more viewers who watch the same television receiver and transmit the individual records to a central location.

Embodiments of the present invention can monitor viewing of television receivers whether in the primary residence, a second residence, another household, or in a public place. A viewer can enter the channel being watched with a pushbutton channel input. For those television receivers with an infrared type of remote control, the viewer is not required to enter the channel being watched. The personal data meter will have an infrared detector similar to that of the television receiver and responsive to the remote control of the television receiver. The personal data meter may have a display which shows, at least, the channel number the personal data meter is recording.

The personal data meter may also include an "O.K." or confirmation button. Each time the television receiver is turned on, the viewer turns on the personal data meter and confirms they are in attendance by setting the channel, which is shown on the display, to the same channel as the channel to which the television set is tuned. If the channel number is already the same as the number of the channel to which the television receiver is tuned, the viewer may press the "O.K." button, thereby confirming they are in attendance. If after a specific time, for example, three or four minutes, the viewer does not confirm attendance as indicated above, then the personal data meter would be programmed to shut off.

If the television receiver is responsive to an infrared type remote control which can turn on the television receiver, then the personal data meter could also be responsive to the remote control and be turned on by the remote control, in much the same way that a cable converter operates. The viewer or respondent would still have to confirm attendance by either setting the channel on the personal data meter or by pressing the "O.K." button. In this case, the personal data meter may also be programmed to turn off after three or four minutes and preferably also programmed so that for a period of several hours it could only be turned on manually. If the remote control has a mute button, the personal data meter can be arranged to respond to that also. A record of any muting may be valuable to the people recording viewer habits.

Once attendance has been confirmed, the viewer has nothing further to do. As the viewer operates the remote control to change channels, the personal data meter also responds to the remote control to change the channel setting it has set into it. The personal data meter records the time of each channel change and the channel involved. At a predetermined time set into the program of the personal data meter, the personal data meter will actuate the cellular telephone module and call a central location. Alternatively, a central location might access the personal data meter by telephone. When a connection is established, the personal data meter will transmit the data stored in its memory. Thus, embodiments of the invention may provide a system that records the viewing habits of one or more viewers watching the same television receiver and which transmits the recorded information automatically to a central location.

Embodiments of the invention may also provide a monitoring system for listeners to radio receivers which requires no connection to a telephone line.

Thus, according to a further aspect of the invention, there is provided a system for monitoring the tuning of receivers for receiving broadcast signals from a selected one of a number of broadcast stations, comprising a personal data meter for each person using one of the receivers, each personal data meter having a cellular telephone module, a control for the cellular telephone module, a clock providing a signal representing the time, a memory, and a means for identifying the particular one of the broadcast stations being received by the receiver, the memory being responsive to the signal representing the time and to the means for identifying the particular one of the broadcast stations being received for storing data on the time at the beginning and end, respectively, of receiving signals from the particular one of the broadcast stations, the control for the cellular telephone module being responsive firstly to a signal from the clock representing a preselected time for calling a preselected number for a central location for receiving data and secondly to a connection being made with the central location for transmitting to the central location the stored data.

BRIEF DESCRIPTION OF THE DRAWINGS

Embodiments of the invention will be described by way of example, with reference to the accompanying drawings, in which.

DETAILED DESCRIPTION OF THE PREFERRED EMBODIMENTS

Figure 1:
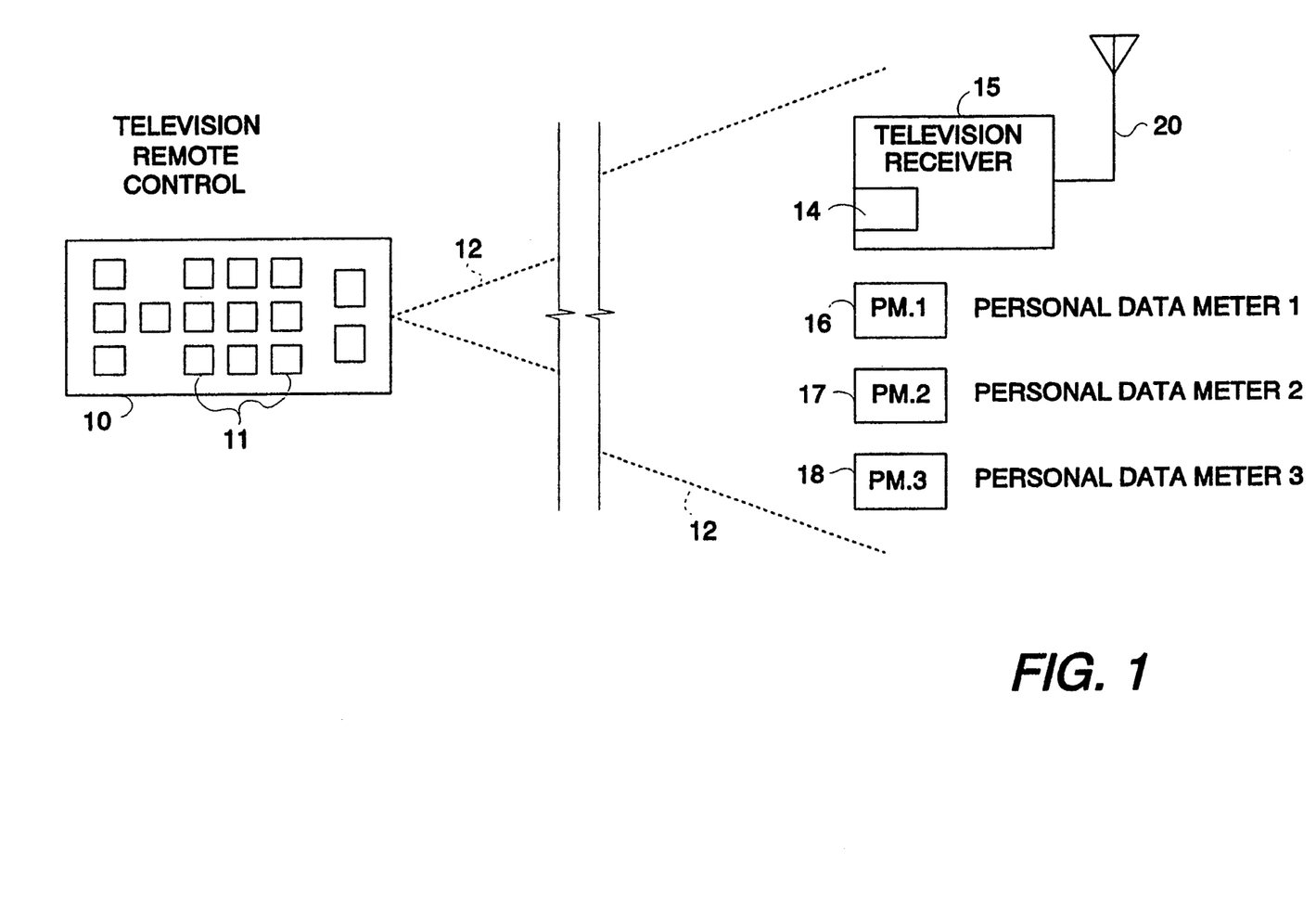
FIG. 1 is a block diagram of a system according to the invention showing an arrangement at a remote viewer location.

Referring first to FIG. 1, there is shown in block form an arrangement, according to the invention, for recording data on a television viewer's viewing activity. An infrared type of remote control 10 for controlling, for example, channel selection in television broadcast receiver 15 is shown. This type of remote control is well known and it may control other operational features of television receiver 15 such as, for example, a mute feature which temporarily switches off the sound in the television receiver 15. The remote control 10 has channel selector means, such as push buttons 11. When a television viewer operates the push buttons 11 to select a channel, the remote control 11 emits an infrared channel selection signal represented by broken lines 12. This infrared signal is detected by an infrared responsive channel selector 14 in television receiver 15 which selects or tunes the desired channel in accordance with the viewer's operation of remote control 10. The channel selection signal may be generated by keying-in a specific channel number or by operating an "up/down" key to switch from one channel to the next.

Adjacent the television receiver 15 there are located one or more personal data meters, designated by blocks 16, 17 and 18, which comprise data collection devices for recording data on the viewing activity of respective television viewers. There is a personal data meter for each person who will be viewing a particular television receiver and three are shown (i.e. personal data meters 16, 17 and 18 having blocks labelled PM.1, PM.2 and PM.N). The personal data meters 16, 17 and 18 have no wired connection with the television receiver 15, or with the television antenna 20 or with the remote control 10. The personal data meters 16, 17 and 18 are simply placed adjacent the television receiver 15 so that each may receive any infrared signal 12 emitted by remote control 10. The personal data meters 16, 17 and 18 can be "taught", i.e. adapted to recognize the different kinds of remote control signal in common usage, in much the same way that some remote controls can be taught signals of other remote controls in a household.

Figure 2:
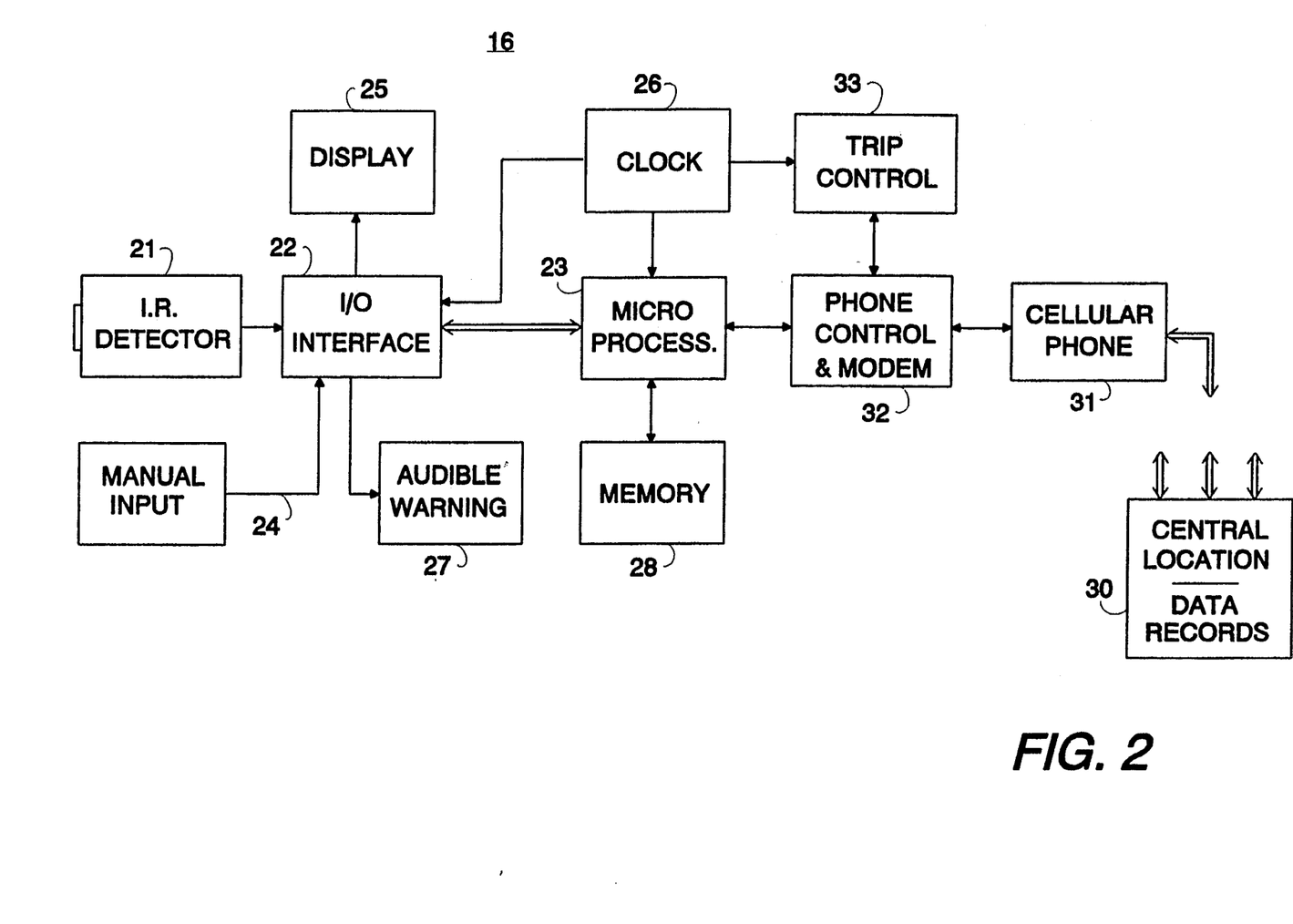
FIG. 2 is a block diagram showing a personal data meter for recording and transmitting to a central location data on a television viewer's habits.

Referring now to FIG. 2, there is shown, in block diagram form, a personal data meter (for example, personal data meter 16). The personal data meter 16 includes an infrared detector 21 which receives the infrared signal from remote control 10 (FIG. 1). The infrared detector 21 is connected to an input/output (I/O) interface 22 which includes various device drivers or circuits for interfacing input and output transducers to a microprocessor 23. When a particular desired channel is selected, the channel selection signal received by infrared detector 21 is decoded by a channel detector (not shown) in the input/output interface 22 to provide a channel identifier signal which is then relayed to the microprocessor 23.

The I/O interface 22 is also connected to manual input circuitry 23 which includes, among other controls, a manually-operated switch for turning on the personal data meter 16. Alternatively, the interface 22 may include means for turning on the personal data meter 16 in response to the infrared signal from remote control 10 (FIG. 1) which turns on the television receiver 15 (FIG. 1). The viewer operates manual input 24 when television receiver 15 (FIG. 1) is first turned on in order to (a) turn on the personal data meter 16 if it is not turned on by the remote control, and (b) set the channel memory device to the same channel as that to which television receiver 15 (FIG. 1) is tuned. Either of these operations generates a confirmation signal to the microprocessor 23 to confirm that the viewer is actually present and paying attention. A display 25, operated by microprocessor 23 by way of a display driver in interface 22, shows the channel to which the device is set and, if desired, the current time. A clock 26 provides a time signal to microprocessor 23.

An audible warning device 27, such as a buzzer, controlled by microprocessor 23, is actuated if, for example, the manual input 24 is operated to set into processor 23 a channel number that is incomplete or non-existent. The audible warning device 27 may also sound if the personal data meter has detected that the television remote control has been operated and the personal data meter has not been initialized, and the viewer's presence confirmed, within a predetermined length of time.

The viewer need only turn on the personal data meter 16 and set the channel when the television receiver 15 (FIG. 1) is first turned on. Any subsequent channel changes made using remote control 10 (FIG. 1) will automatically be detected by the personal data meter 16 in response to the same infrared signal that changes the channel in the television receiver.

Preferably the personal data meter 16 is powered by a battery (not shown) so that there need be no connections required when it is in use, not even to the household AC supply.

The channel detector in interface 22 provides a signal to microprocessor 23 representing the channel of record and microprocessor 23 stores the information in a location in a memory 28, together with data on the beginning time and end time at which the channel was selected by remote control 10 (FIG. 1) or, initially, by manual input to the personal data meter 16 if, for example, the television is already operating when the viewer enters the room. However, to avoid recording times for each channel selected when a viewer is scanning through a number of channels, it is desirable not to provide a record of channels selected for less than a preset short time, say for example, five seconds or less. With this exception, the data is stored in memory 28.

Preferably once a day at a preselected time when it is unlikely there will be much television viewing being recorded, for example between 2 a.m. and 6 a.m., the data recorded in memory 28 is transmitted to a central location 30. Each personal data meter 16 has a cellular telephone module 31 with a cellular telephone control and modem 32. A trip control 33 is actuated by a time signal derived from clock 26 and representing a preselected time to transmit data. The trip control 33, in turn, actuates cellular telephone control and modem 32. The cellular phone control 32 controls the cellular telephone module 31 and calls a preset number for central location 30. When communication is established with central location 30, the cellular phone control 32 causes microprocessor 23 to access memory 28 and pass the data stored in memory 28 to cellular phone control and modem 32 and cellular telephone module 31 to central location 30. The data is automatically stored at central location 30. The data from each personal data meter is identified by an identification number associated with that personal data meter and transmitted with the data. When the data has been satisfactorily transferred to the central location 30, a signal from the central location 30 causes microprocessor 23 to clear memory 28 for the storing of new data. If communication is not established with the central location 30, the cellular telephone control 32 will try again after a predetermined interval to establish communication.

The time required for a personal data meter to transfer data is relatively short. A typical calling procedure might take of the order of 20 seconds with a few more seconds to ensure that satisfactory communication has been established. Transfer of, say, one kilobyte of data, stored in memory 28 to central location 30 might take of the order of 4 to 5 seconds (2400 baud). Thus a time of 30 seconds might be involved in a typical transfer. There may be more data stored in memory 28 and more time may be required. For example, there may be almost continuous television operation by a viewer with many channel changes. Also, muting of the television sound output by operation of the remote control may be detected by the interface 22 and the information recorded and transmitted along with the channel data. However, in most cases the time will not exceed 60 seconds and it is rarely expected to exceed two minutes. Thus, the trip controls for each of the personal data meters might be set to initiate calling one minute apart. For each number available at the central location there could be 60 transfers of data per hour. Limited opportunity for re-dialling when communication is not established on the first try, is provided by either extending the time period for each transfer or by providing a re-dialling window at the end of the transfers. The trip control 33 is set for re-dialling accordingly.

It will be seen that if there are two personal data meters at a television receiver, each associated with an individual viewer, the first individual turns on the television receiver, turns on the personal data meter assigned to that individual, and sets the appropriate starting channel into the personal data meter. The second individual, who may start viewing after the first but while the first individual is still viewing, turns on the personal data meter assigned to that individual, and sets into that personal data meter the channel currently being watched.

The audible warning device 27 is connected to microprocessor 23. If there have been no changes in the channel selector 14 in a long time, for example four hours, the audible warning device 27 is actuated. If the viewer is present, the viewer may terminate the audible warning by re-entering the number of the channel being watched either manually or by an infrared remote control or by pressing an "OK" button. If the viewer is not present or takes no action, the audible warning will continue to sound for a preset time, for example 30 seconds, and then the microprocessor will turn off the personal data meter.

Figure 3:
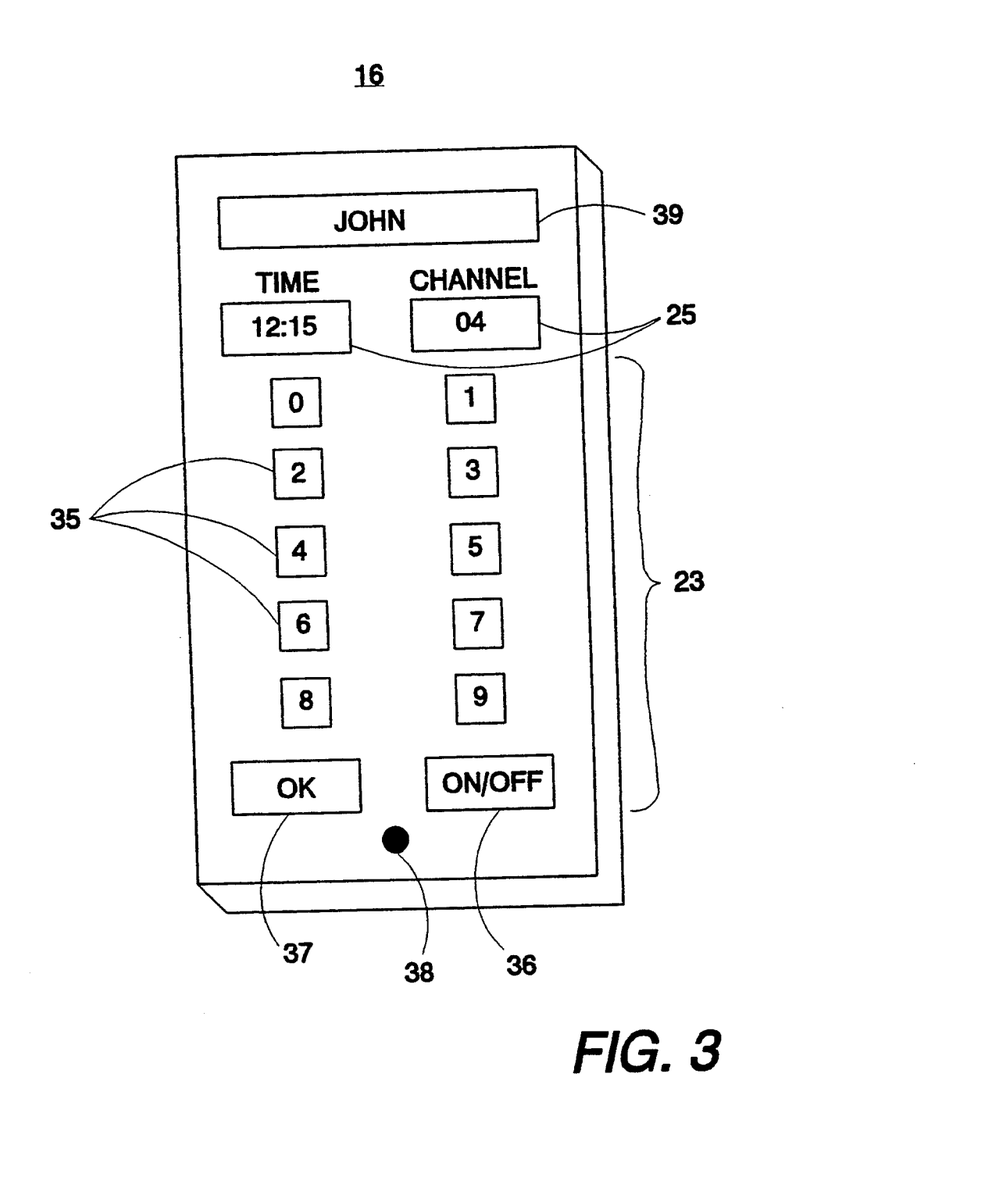
FIG. 3 is a front view of a typical personal data meter.

Referring now to FIG. 3, there is shown a front view of a typical personal data meter, for example personal data meter 16 (FIGS. 1 and 2). The display 25 comprises one side to display time and one side to display the current channel number. Push buttons 35 for channel selection, 36 for on/off switching and 37 for an "OK" button, form the manual input means 24 (FIG. 2). An infrared light receiver 38 of infrared detector 21 (FIG. 2) receives and responds to infrared light from a remote control. A name sticker 39 is used to identify the individual to whom the personal data meter is assigned. In order to record data pertaining to the watching of video tapes or the playing of video games, it is desirable to set aside particular channel numbers for each of these activities.

Figure 4:
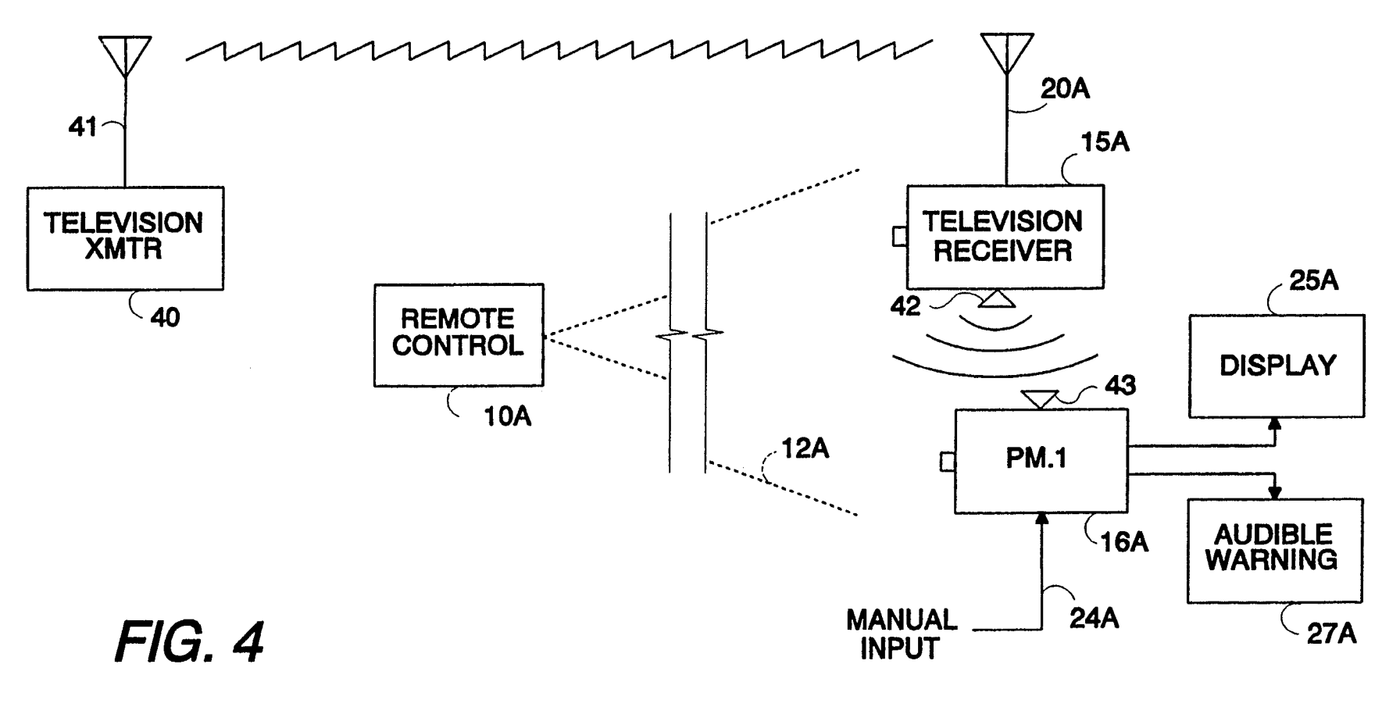
FIG. 4 is a block diagram showing a system responding to an additional signal from the television station.

Referring now to FIG. 4, another embodiment of the invention is shown. A television transmitter 40 broadcasts a television signal via transmitting antenna 41. In this instance the television broadcast signal will include an additional signal on the sound carrier as will be described. The television broadcast signal is received by the television antenna 20A coupled to a television receiver 15A having the usual speaker 42. A personal data meter 16A is shown with its associated display 25A and a manual input 24A. As before, the television receiver 15A is responsive to an infrared signal (represented by broken lines 12A) from a remote control 10A to turn on the television receiver 15A and to tune the television receiver 15A to desired channels. Also, as before, the personal data meter 16A is responsive to the same infrared signal from remote control 10A to turn on personal data meter 16A and to change the channel numbers recorded by personal data meter 16A in accordance with the channels selected on television receiver 15A. Also, as before, the personal data meter 16A has a manual input 24A which is used when the personal data meter is turned on to either set the channel number indicated on display 25A to be the same as the channel to which television receiver 15A is tuned, or establish that the channel number is correct. An audible warning device 27A is also shown.

The personal data meter 16A has, in addition, a sound responsive device or sound detector 43. There is an additional signal introduced onto the sound carrier by the television broadcast transmitter or television station 40. This additional signal is conveniently just outside the audible range, conveniently a sub-audio signal. This additional signal may be continuous or may be transmitted when desired. This additional signal will be generated from speaker 42 on television receiver 15A and will be received by sound detector 43. If, for example, the television receiver is turned on but the personal data meter has, for some reason, not been turned on, personal data meter 16A will be turned on by this signal and the audible warning 27A will sound. If desired, display 25A may also be caused to flash. The viewer must respond with an appropriate input at manual input 24A. If there is no response confirming the presence of the viewer, the personal data meter is programmed to turn off after a short interval and would not be again activated by this additional signal for a period of several hours.

Figure 5:
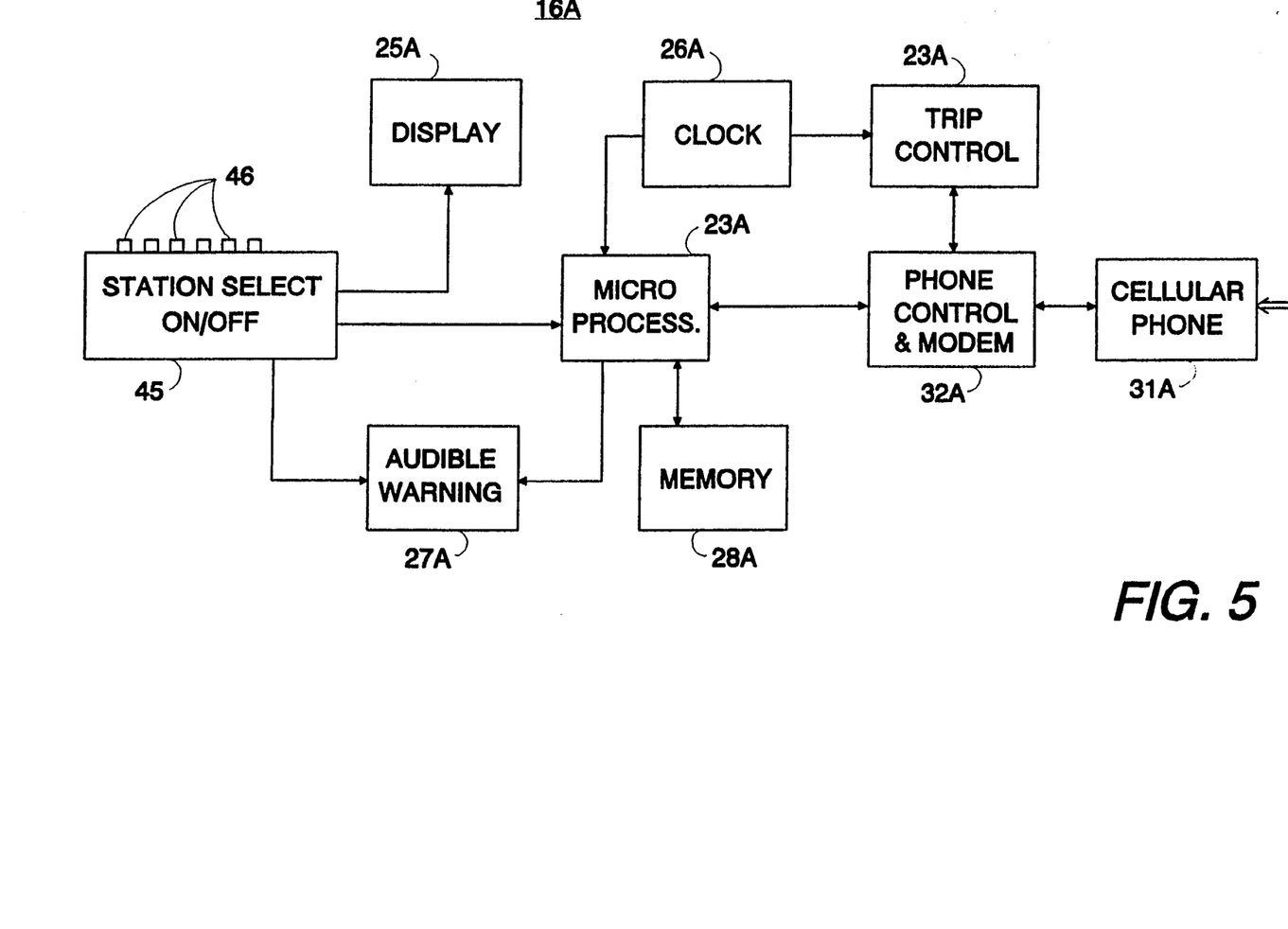
FIG. 5 is a block diagram showing a personal data meter suitable for recording and transmitting to a central location data on a radio listener's habits.

Referring now to FIG. 5, there is shown in block form a personal data meter 16A suitable for monitoring the listening habits of a radio listener. Because there is normally no infrared remote control for the average radio, the radio listener is required to do more than the television viewer. The personal data meter 16A is placed conveniently near the radio used by the listener involved in the monitoring. When the listener turns on the radio, the listener must also turn on the personal data meter 16A and select the same radio station on the channel select memory 45 as that to which the radio is tuned. This selection is made by depressing an appropriate one of the push buttons 46. The push button 46 that is depressed is labelled with the call letters of the radio station, and the display 25A may show the call letters of the station, the operating frequency and any other desired information. Audible warning device 27A is actuated if the listener forgets to depress one of the push buttons 46.

It will be seen that whenever the listener wishes to listen to another station, the listener must not only tune the radio receiver to the desired station but must also depress the appropriate one of push buttons 46.

Each of the remaining blocks representing circuitry in FIG. 5 operates in the same manner as corresponding blocks in FIG. 2 and it is believed no further description is required.

Figure 6:
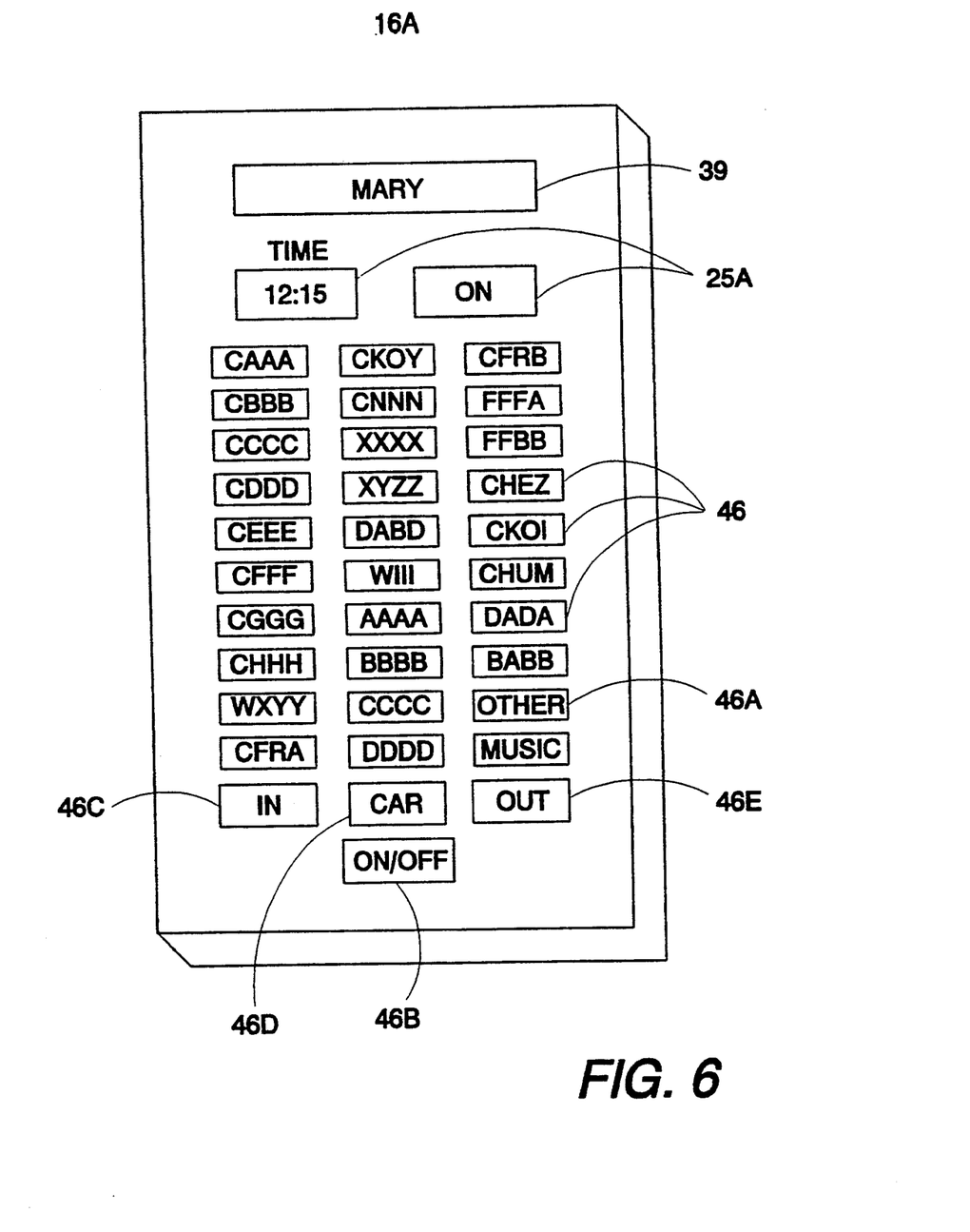
FIG. 6 is a front view of a personal data meter suitable for recording and transmitting data on a radio listener's habits.

FIG. 6 is a front perspective view of the radio personal data meter 16A whose circuitry in block form was shown in FIG. 5. A name sticker 39 is used to identify the personal data meter being used by a particular individual. The display 25A shows current time and the operating condition, that is "ON" or "OFF". The push buttons 46 each represent a radio station in the listening area which could be tuned in by the listener using personal data meter 16A. There is a push button 46A that can be pushed when the listener is listening to tapes or CDs or other recordings. There is an "ON/OFF" push button 46B. There are buttons 46C, 46D and 46E which represent location, such as indoors, outdoors, automobile, for example.

The personal data meter 16A is battery powered, as are the other personal data meters described. This enables them to be carried anywhere. As long as the personal data meter is in an area where cellular telephone communication is feasible, then the transmitting of recorded data requires no action by the listener or viewer. Unlike prior devices, no wired connections to radio, television receivers or telephone systems is required.

It will be appreciated that, although the specific embodiment describes a system in which the television receiver receives the broadcast signal by means of an antenna 20, the invention is also applicable to cable and other television systems.

It is believed that the preceding description will provide a clear understanding of the invention.

An advantage of providing the data collection device with a cellular telephone module is that it permits data to be collected very promptly, enabling statistics to be compiled quickly, for example after a specific program has been transmitted. An advertising campaign could than be modified very quickly in dependence upon the feedback provided in this way. Nevertheless, it is envisaged that embodiments of the invention which respond to the remote control channel selection signal could omit the cellular telephone module. The data could be retrieved some other way. Even without the cellular telephone module, such a device has advantages over other devices since it provides automatic capturing of channel changes while requiring a limited manual input to confirm the presence of the user.

It should be appreciated that the device could be modified, primarily by programming of the processor, to collect other kinds of data as well, for example audience reaction to programme or advertisement content, or public opinion polls.

I claim:

1. A system for monitoring audience attention to receivers for receiving broadcast signals from a number of broadcast stations, comprising a portable personal data meter for each person to be monitored attending to one of said receivers, each portable personal data meter being a wireless single unit capable of being carried upon the person and comprising, a cellular telephone module for communicating with a central location, a control for said cellular telephone module, a clock providing a signal representing time, a memory for storing data, a detector means for providing a station identifier identifying the particular one of said broadcast stations being received by said receiver, and a processor means, said processor means being responsive to said signal representing the time and to said station identifier for storing in said memory data comprising the time at the beginning and end of receiving signals from said particular one of said broadcast stations, and the station identification, said control serving to control operation of said cellular telephone module to transmit to said central location the said data stored in said memory.

2. A system as claimed in claim 1, wherein said control for said cellular telephone module is responsive firstly to a signal from said clock representing a predetermined time for calling a preselected number for a central location for receiving data, and secondly to a connection being made with said central location to initiate transmission of said data.

3. A system as claimed in claim 1, wherein said control for said cellular telephone module is responsive to a request in a call initiated by said central location to transmit said data.

4. A system as claimed in claim 1, for monitoring the viewing activity of television viewers at a plurality of remote locations and transmitting data relating to the viewing activity to a said central location, each said receiver comprising a television broadcast receiver having a plurality of selectable channels corresponding to said broadcast signals and a viewer-operated remote control for generating at least a channel selection signal for selecting a desired one of said plurality of channels, each personal data meter comprising a detector responsive to said channel selection signal for providing a station identifier identifying the channel to which the said television receiver is tuned, said processor unit being operable to record in said memory the channel identifier and period for which such channel was selected.

5. A system as claimed in claim 4, wherein each said personal data meter further comprises a manual input means operable by the user to provide a confirmation signal confirming presence and attention to the receiver, and a warning device, said processor means being operable to operate said warning device in the absence of such confirmation signal within a predetermined time interval.

6. A system as claimed in claim 1, wherein each personal data meter has user-operated input means for providing a confirmation signal indicating user presence, and the processor means is further responsive to said confirmation signal at least for beginning to store said dam.

7. A system for monitoring audience attention to receivers for receiving broadcast signals from a number of broadcast stations, each said receiver comprising a television broadcast receiver having a plurality of selectable channels corresponding to said broadcast signals and a viewer-operated remote control for generating at least a channel selection signal for selecting a desired one of said plurality of selectable channels, a portable personal data meter for each person to be monitored attending to one of said receivers, each portable personal data meter having a cellular telephone module for communicating with a central location, a control for said cellular telephone module, a clock providing a signal representing time, a memory for storing data, a detector means for providing a station identifier identifying the particular one of said broadcast stations being received by said receiver, and a processor means, said detector means being responsive to said channel selection signal for providing a station identifier identifying the channel to which the said television receiver is tuned, said processor unit being operable to record in said memory the channel identifier and period for which such channel was selected, said processor means being responsive to said signal representing the time and to said station identifier for storing in said memory data comprising the time at the beginning and end of receiving signals from said particular one of said broadcast stations, and the station identification, said control serving to control operation of said cellular telephone module to transmit to said central location the said data stored in said memory, each said personal data meter further comprising a manual means for entering the number of the channel corresponding to the desired channel number to which said television receiver is tuned, said processor being operable to detect correspondence between the channel identifier derived from the remote control signal and the channel identification entered manually and commence recording said data when they correspond.

8. A system as claimed in claim 7, wherein each said personal data meter further comprises a warning device and said processor means is operable to operate the warning device if such correspondence is not detected within a predetermined time interval after the personal data meter has been turned on.

9. A system for monitoring audience attention to receivers for receiving broadcast signals from a number of broadcast stations, comprising a portable personal data meter for each person to be monitored attending to one of said receivers, each portable personal data meter having a cellular telephone module for communicating with a central location, a control for said cellular telephone module, a clock providing a signal representing time, a memory for storing data, a detector means for providing a station identifier identifying the particular one of said broadcast station being received by said receiver, and a processor means, said processor means being responsive to said signal representing the time and to said station identifier for storing in said memory data comprising the time at the beginning and end of receiving signals from said particular one of said broadcast stations, and the station identification.

said control serving to control operation of said cellular telephone module to transmit to said central location the said data stored in said memory, the broadcast signal from said selected one of said broadcast stations having an additional signal imposed on the sound carrier outside the normal audio range, and each said personal data meter further comprising a sound detector for said additional signal, and a warning device, said processor being responsive to said additional signal for energizing said warning device requiring manual input from a respective one of said persons and, on receipt of such manual input, commencing recording of said data.

10. A data collection device for use in monitoring audience attention to receivers for receiving broadcast signals from a number of broadcast stations, said device being a wireless single unit capable of being carried upon the person of a member of said audience and comprising a portable personal data meter comprising a cellular telephone module for communicating with a central location, a control for said cellular telephone module, a clock providing a signal representing time, a memory for storing data, a detector means for providing a station identifier identifying the particular one of said broadcast stations being received by said receiver, and a processor means, said processor means being responsive to said signal representing the time and to said station identifier for storing in said memory data comprising the time at the beginning and end of receiving signals from said particular one of said broadcast stations, and the station identification, said control serving to control operation of said cellular telephone module to transmit to said central location the said data stored in said memory.

11. A device as claimed in claim 10, wherein said control for said cellular telephone module is responsive firstly to a signal from said clock representing a predetermined time for calling a preselected number for a central location for receiving data, and secondly to a connection being made with said central location to initiate transmission of said data.

12. A device as claimed in claim 10, wherein said control for said cellular telephone module is responsive to a request in a call initiated by said central location to transmit said data.

13. A device as claimed in claim 10, for monitoring the viewing of a television broadcast receiver having a plurality of selectable channels corresponding to said broadcast signals and a viewer-operated remote control for generating at least a channel selection signal for selecting a desired one of said plurality of television broadcast channels, said device comprising a detector responsive to said channel selection signal for providing a station identifier identifying the channel to which the said television receiver is tuned, said processor being operable to record in said memory the channel identifier and period for which such channel was selected.

14. A device as claimed in claim 13, further comprising a manual input means operable by the user to provide a confirmation signal confirming presence and attention to the receiver, and a warning device, said processor means being operable to operate said warning device in the absence of such confirmation signal within a predetermined time interval.

15. A device as claimed in claim 10, further comprising user-operated input means for providing a confirmation signal indicating user presence, the processor means being responsive to a said confirmation signal at least for beginning to store said data.

16. A data collection device for use in monitoring audience attention to receivers for receiving broadcast signals from a number of broadcast stations, each receiver comprising a television broadcast receiver having a plurality of selectable channels responding to said broadcast signals and an associated viewer-operated remote control for generating at least a channel selection signal for selecting a desired one of said plurality of television broadcast channels, said device comprising a portable personal data meter comprising a cellular telephone module for communicating with a central location, a control for said cellular telephone module, a clock providing a signal representing time, a memory for storing data, a detector means for providing a station identifier identifying the particular one of said broadcast stations being received by said receiver and a processor means, said processor means being responsive to said signal representing the time and to said station identifier for storing in said memory data comprising the time at the beginning and end of receiving signals from said particular one of said broadcast stations, and the station identification, said control serving to control operation of said cellular telephone module to transmit to said central location the said data stored in said memory, said detector means being responsive to said channel selection signal for providing a said station identifier identifying the channel to which the television receiver is tuned, said processor being operable to record in said memory the channel identifier and period for which such channel was selected, the device further comprising manual input means for entering the number of the channel corresponding to the desired channel number to which said television receiver is tuned, and said processor detecting correspondence between the channel identifier provided in response to the channel selection signal and the channel identification entered manually and commencing recording of said data when they correspond.

17. A device as claimed in claim 16, further comprising a warning device and wherein said processor means is operable to operate the warning device if such correspondence is not detected within a predetermined time interval after the personal data meter has been turned on.

18. A data collection device for use in monitoring audience attention to a receiver for receiving broadcast signal, from a number of broadcast stations, the broadcast signals having an additional signal imposed on the sound carrier outside normal audio range, said device comprising a portable personal data meter comprising a cellular telephone module for communicating with a central location, a control for said cellular telephone module, a clock providing a signal representing time, a memory for storing data, a detector means for providing a station identifier identifying the particular one of said broadcast stations being received by said receiver and a processor means, said processor means being responsive to said signal representing the time and to said station identifier for storing in said memory data comprising the time at the beginning and end of receiving signals from said particular one of said broadcast stations, and the station identification, said control serving to control operation of said cellular telephone module to transmit to said central location the said data stored in said memory, said device further comprising a sound detector for said additional signal, and a warning device, said processor being responsive to said additional signal for energizing said warning device and requiring manual input from a respective one of said persons and, on receipt of such manual input, commencing recording of said data.

19. A device as claimed in claim 18, for monitoring the viewing activity of a television viewer at a remote location and transmitting data relating to the viewing activity to a said central location, each said receiver comprising a television broadcast receiver operable by means of a viewer-operated remote control for generating at least a channel selection signal for selecting a desired one of said plurality of television broadcast channels, said detector means in said device being responsive to said channel selection signal for providing said station identifier.

20. A data collection device for collecting data on the viewing habits of a person viewing a television receiver capable of being tuned to receive one of a plurality of channels, each channel representing a television signal from a respective one of a plurality of television broadcast stations, the television receiver being operable by means of a remote control for generating at least a channel selection signal, the device being a wireless single unit capable of being carried upon the person and comprising detector means responsive to said channel selection signal for providing a station identifier, clock means for providing a time signal representing current time, manual input means for entering a confirmation signal indicating that the viewer is in attendance, processor means responsive initially to said station identifier, said confirmation signal and said clock means for recording said channel and said time signal as representing the time at which said channel was selected and the time at which said selection of said channel was discontinued, and responsive subsequently to said station identifier and said time signal to record changes in the channel to which the receiver is tuned and the times at which such changes occurred.

21. A device as claimed in claim 20, further comprising audible warning signal generating means operable in the event that said confirmation signal is not received within a predetermined time elapsed from initial channel selection.

22. A data collection device for collecting data on the listening habits of a person using said data collection device and listening to one of a plurality of radio signal broadcasting stations, and for transmitting collected data to a central location, the device being a wireless single unit capable of being carried upon the person and comprising means for receiving a manual input representing said one of a plurality of broadcasting stations and providing a signal representing the respective broadcast station, a clock means for providing a time signal, memory means, a processor for receiving said time signal and said signal representing the respective broadcast station and storing in said memory means data representing the start time and the stop time for listening to said respective broadcast station, a cellular telephone module, and a control for said cellular telephone module, said control being operable to cause the cellular telephone module to transmit to said central location the said data stored in said memory.

* * * * *